No. 893,190. PATENTED JULY 14, 1908.
F. E. NEWLON.
PLANT SPACER.
APPLICATION FILED DEC. 3, 1906.
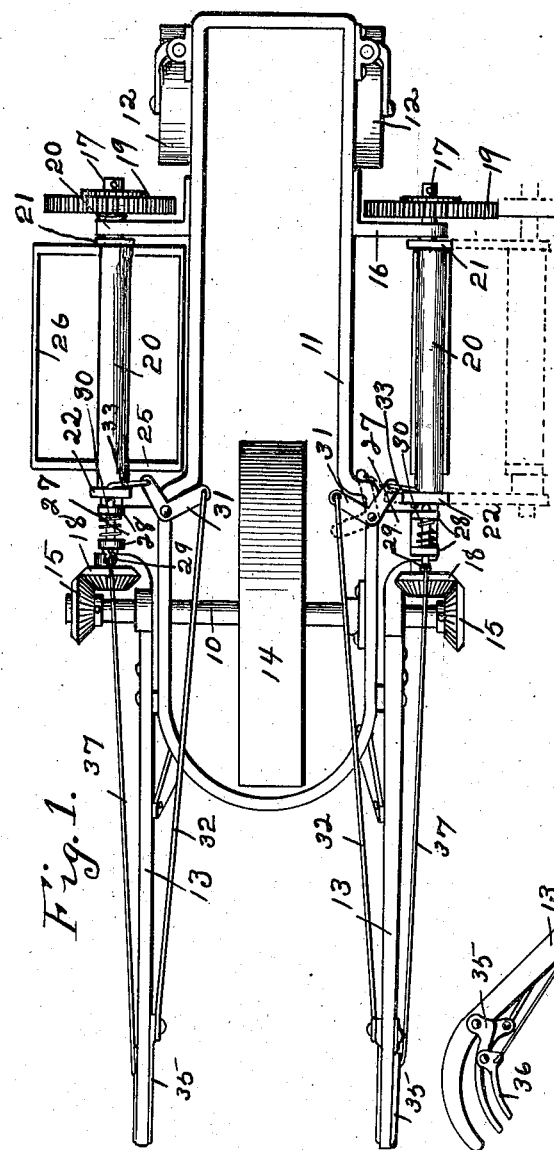
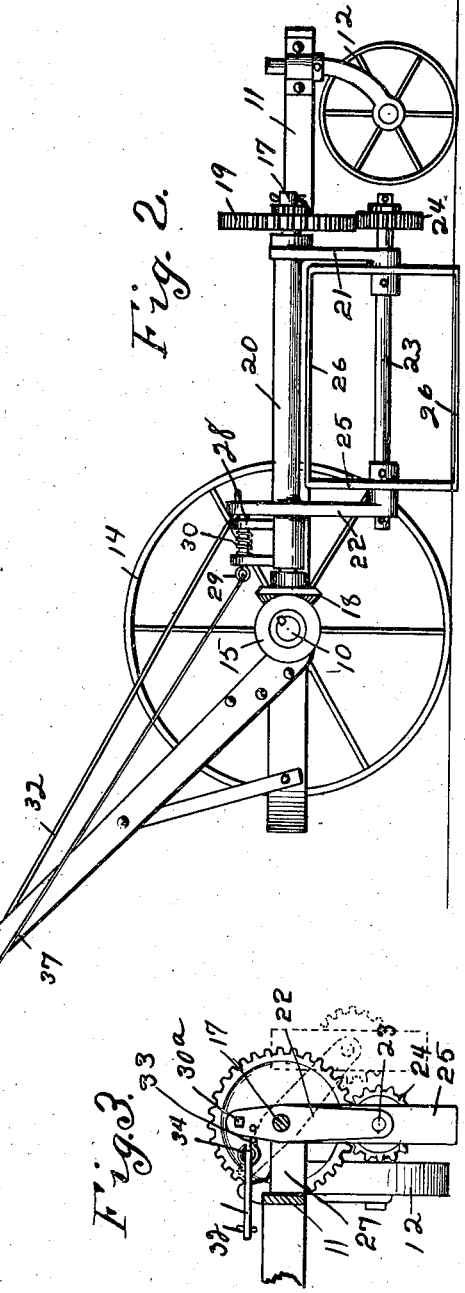
Witnesses,
A. G. Hague
G. C. Stirling
Inventor, F. E. Newlon
by Orwig & Lane attys

UNITED STATES PATENT OFFICE.

FRANCIS E. NEWLON, OF CULBERTSON, NEBRASKA.

PLANT-SPACER.

No. 893,190.  Specification of Letters Patent.  Patented July 14, 1908.

Application filed December 3, 1906. Serial No. 346,085.

To all whom it may concern:

Be it known that I, FRANCIS E. NEWLON, a citizen of the United States, residing at Culbertson, in the county of Hitchcock and State of Nebraska, have invented a certain new and useful Plant-Spacer, of which the following is a specification.

My improved plant spacer is especially designed for use in connection with beets or other plants that are drilled, or placed in rows and which require some of the plants to be cut out of the rows in order to give room to the other plants for proper development.

My object is to provide a machine of simple, durable and inexpensive construction that may be pushed by the operator between two rows of plants and that will automatically cut out the plants in the rows that are superfluous and my object is further to provide means, that may be readily, quickly and easily operated by the person pushing the device, to throw the cutting mechanism away from the rows, so that in the event that the plants of either row are spaced apart far enough, the cutting mechanism will remain inoperative until again thrown into position by the operator.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a plan view of the complete machine embodying my invention, the dotted lines show the position of one of the plant cutting devices supported at the side of a row where it will not engage the plants. Fig. 2 shows a side elevation of same, and Fig. 3 shows an enlarged detail view illustrating the mechanism for swinging the knife supporting frame to position away from the row being cultivated, the dotted lines in this figure show said frame swung to inoperative position.

Referring to the accompanying drawings, I have used the reference numeral 10 to indicate the main axle of the device to which an oblong frame 11 is connected. The forward end of this frame is supported upon caster wheels 12 and fixed to the rear of the frame are the handles 13 by which an operator may push the device between two rows of plants being cultivated. Fixed to the shaft 10 is the traction wheel 14 and on the ends of the shaft are the beveled pinions 15.

The plant cutting devices on each side of the frame are exactly alike, hence but one will hereinafter be particularly described. Projecting outwardly from the side of the frame are two brackets 16 in which the shaft 17 is rotatably mounted and extended parallel with the side of the frame. The said shaft 17 is provided on one end with a beveled pinion 18 to mesh with the pinion 15 and on its other end is detachably mounted a pinion 19. Loosely mounted on the shaft 17 between the brackets 16 is a sleeve 20 having fixed to its forward end a downwardly projecting arm 21 and to its rear end an arm 22 that projects downwardly below the shaft and also upwardly above the shaft. Rotatably mounted in these arms 21 and 22 is the shaft 23 having a pinion 24 detachably mounted on its forward end. Fixed to the shaft 23 between its supporting arms is the knife bearing frame 25 having two knives 26 at diametrically opposite sides with their cutting edges parallel with the adjacent sides of the main frame and so arranged that when the arms 21 and 22 are extended downwardly the said knives will enter the ground a slight distance during their rotation, the said pinion 24 being operated during the advance of the machine by the pinion 19.

Fixed to the main frame in the rear of the arm 22 is a lateral extension 27 having two upwardly projecting lugs 28 in which is slidingly mounted a bolt 29 held by the spring 30 in position toward the arm 22, said arm being provided with an opening 30$^a$ to receive said bolt when the arm 22 is in an upright position.

Pivotally mounted to the frame 11 adjacent to the arm 22 is a bell crank lever 31 having an operating rod 32 connected with one end and a link 33 connected with its other end, which link is also connected to a hook 34 attached to the arm 22. Pivotally mounted on the handle is a lever 35 having the rod 32 connected therewith and pivotally mounted on the lever 35 is a short lever 36 having a rod 37 pivoted to it and connected to the slide bolt 29. If the operator desires to swing the arms 21 and 22 outwardly away from the machine, he grasps the lever 36 first and moves it toward the handle 13 and then moves the lever 35 toward the handle 13. This will cause the slide bolt 29 to be removed from engagement with the arm 22 and then it will cause the upper end of the arm 22 to be swung inwardly and the lower end of said arm together with the arm 21 to swing outwardly and upwardly.

In practical use and assuming that an operator is advancing the device between two rows of beets or other plants to be properly spaced apart, he pushes and guides the machine by means of the handles and both pairs of plant cutting knives will be rotated by the gearing devices in a manner to cut out from the rows the plants engaged by said knives. It is obvious that the machine will advance some distance between the times when one knife blade cuts out some of the plants and the next knife blade reaches a position adjacent to the row ready to make the next cut and hence a number of plants will remain standing between the ones cut out by each operative stroke of the cutting knives. Assuming that a portion of one of the rows and the plants therein spaced apart a proper distance, then the operator manipulates the levers 35 and 36 as required to throw the plant cutting knives to position where they will not engage the plants and hence the plants at this portion of the row will not be cut. As soon as a portion of the row is reached where the plants require cutting, the operator releases the levers 35 and 36 and the knife bearing frame will swing by gravity to a vertical position and the bolt 29 will be moved by its spring to position for locking the arm 22.

Having thus described my invention, what I claim and desire to secure by Letters Patent of the United States, therefor is—

1. In a device of the class described, the combination of a frame, supporting wheels therefor, arms extended outwardly from one side thereof, hangers pivoted to said arms and extended downwardly, a shaft carried by said hangers, a rotary cutter mounted on said shaft, means for swinging said hangers upwardly and outwardly to elevate the cutters, and a gearing device for operating the shaft by power from a supporting wheel.

2. In a device of the class described, the combination of a frame, supporting wheels for the frame, a shaft extended longitudinally of the frame, a gearing device for operating said shaft by power from a supporting wheel, hangers pivoted to said shaft, a rotary cutter carried by said hangers, a gearing device connecting the rotary cutter with said shaft, manually operated means for swinging the lower ends of the hangers outwardly and upwardly, an automatic slide bolt for holding the cutter in its elevated position.

Des Moines, Iowa, June 8, 1906.

FRANCIS E. NEWLON.

Witnesses:
 ALEC CHANDLER,
 W. J. HISLOP.